United States Patent [19]
Chen

[11] Patent Number: 5,163,985
[45] Date of Patent: Nov. 17, 1992

[54] MOVABLE INDUSTRIAL DUST COLLECTOR

[76] Inventor: Peter Chen, No. 9, Alley 7, Jung-Ho Lane, Pei-Tuen Area, Taichung City, Taiwan

[21] Appl. No.: 828,260

[22] Filed: Jan. 30, 1992

[51] Int. Cl.⁵ .................................................. B01D 46/00
[52] U.S. Cl. ...................................... 55/356; 55/378; 55/473; 55/429
[58] Field of Search ............... 55/356, 357, 473, 378, 55/429; 15/347, 348

[56] References Cited

U.S. PATENT DOCUMENTS 2,519,741  8/1950  Caughey ...................... 55/429
4,715,872  12/1987 Snyder ........................ 55/357
4,993,107  2/1991  Zoni .......................... 55/429

Primary Examiner—Bernard Nozick
Attorney, Agent, or Firm—Browdy and Neimark

[57] ABSTRACT

A movable industrial dust collector comprises mainly a base having a plurality of casters and a column provided with a columnar hole. The base further comprises a support set holding thereon a suction set communicating with the columnar hole of the base by means of a suction hose. A filtration set disposed on the suction set is provided with a filtration bag permitting the air drawn into the dust collector to be released and with a dust bag for use in depositing the dust and other unwanted objects drawn into the dust collector.

6 Claims, 4 Drawing Sheets

MOVABLE INDUSTRIAL DUST COLLECTOR

BACKGROUND OF THE INVENTION

The present invention relates to an industrial dust collector, and more particularly to a movable industrial dust collector.

As shown in FIG. 1, an industrial dust collector 10 of the prior art comprises mainly a base 12, which in turn is composed of four legs 13 and a hollow housing 14 having a plurality of breathable dust collecting bags 15 attached oppositely to both sides thereof. An air pump 16 is attached to one end of the housing 14 in such a manner that its air outlet 17 communicates with the interior of housing 14. There are a plurality of tube connectors 19 disposed at the place where the air inlet 18 of the air pump 16 is located, while there is at least one dust collecting tube 11 connected to the tube connector 19.

The operation of the prior art industrial dust collector 10 is initiated by the start of the air pump 16, which generates a stream of suction to draw the dust and the other wastes into the dust collecting tube 11 and into the housing 14 via the air pump 16. The air drawn into is finally released via the breathable dust collecting bag 15, while the dust and other wastes drawn into are deposited in the dust collecting bag 15.

The prior art dust collector 10 described above is stationary. Therefore, an extended dust collecting tube 11 must be employed so as to permit the dust collector 10 to reach every corner of the shop floor. As a result, the efficiency of the dust collector 10 in cleaning by suction at a distant corner of the shop floor is greatly compromised. In addition, an extended dust collecting tube 11 laying on the shop floor is a nuisance as well as an inconvenience to the operator of dust collector 10 and other fellow workers in the shop.

SUMMARY OF THE INVENTION

It is therefore the primary objective of the present invention to provide a movable industrial dust collector, which can be moved around on the shop floor to do the cleaning of the floor.

In keeping with the principles of the present invention, the primary objective of the present invention is accomplished by a movable industrial dust collector, which comprises mainly a base, a support set, a suction set, and a filtration set. The base is provided with plural sets of casters, while the support set is disposed on the base to hold securely the suction set. The filtration set is set up on the suction set so as to deposit therein the dust and the other unwanted objects drawn into the dust collector from the shop floor.

DETAILED DESCRIPTION OF THE PREFERRED EMBODIMENT

Figure 1:
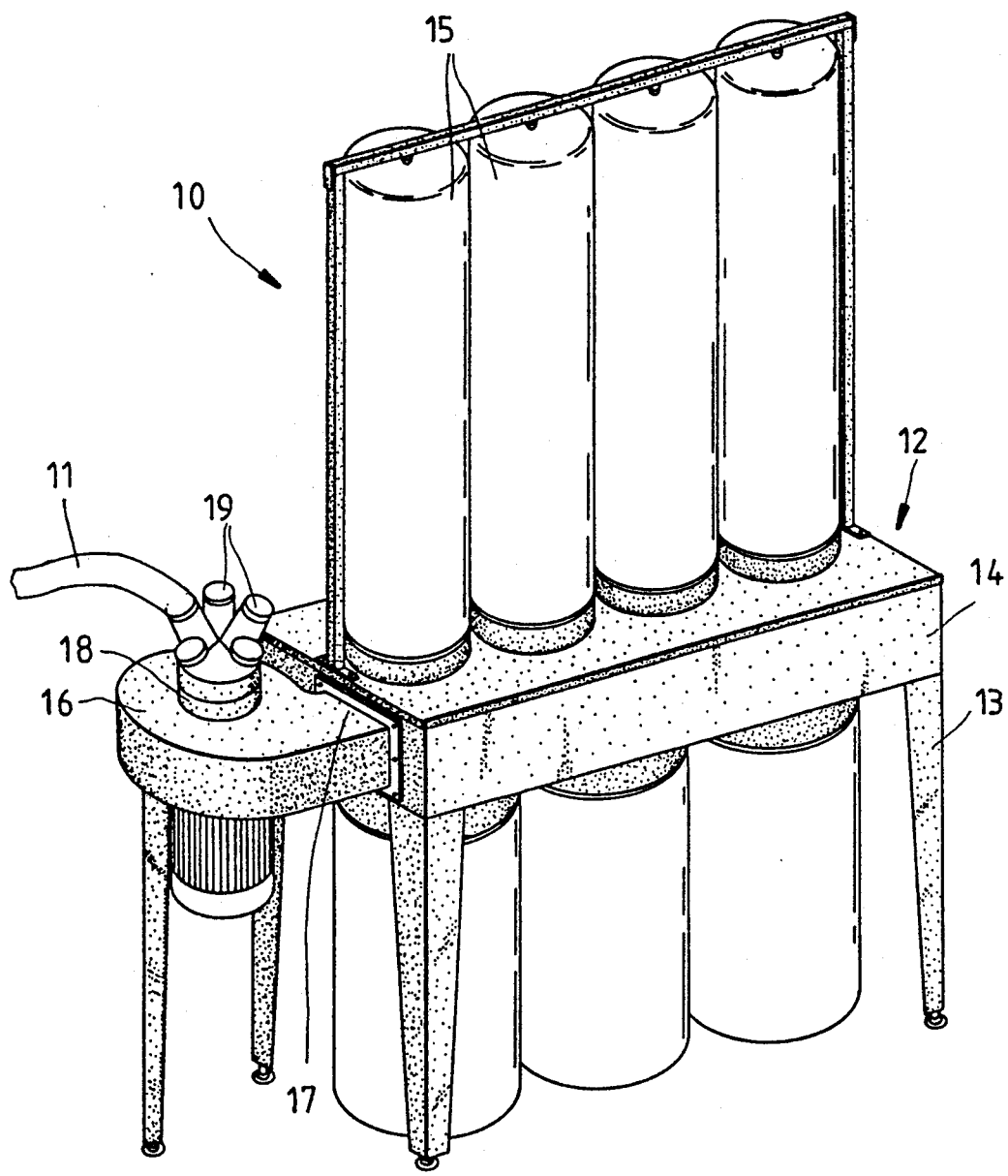
FIG. 1 shows a three-dimensional view of an industrial dust collector of the prior art.
Figure 2:
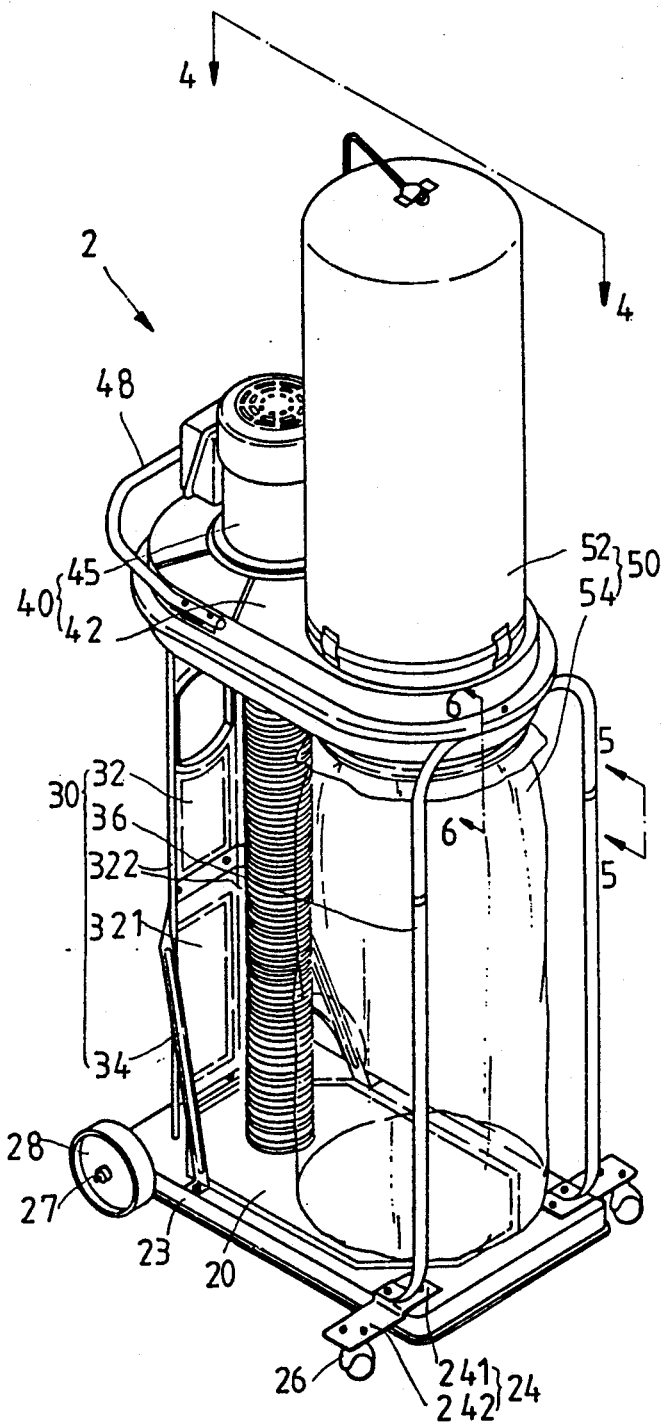
FIG. 2 shows a three-dimensional view of an industrial dust collector of the present invention.
Figure 3:
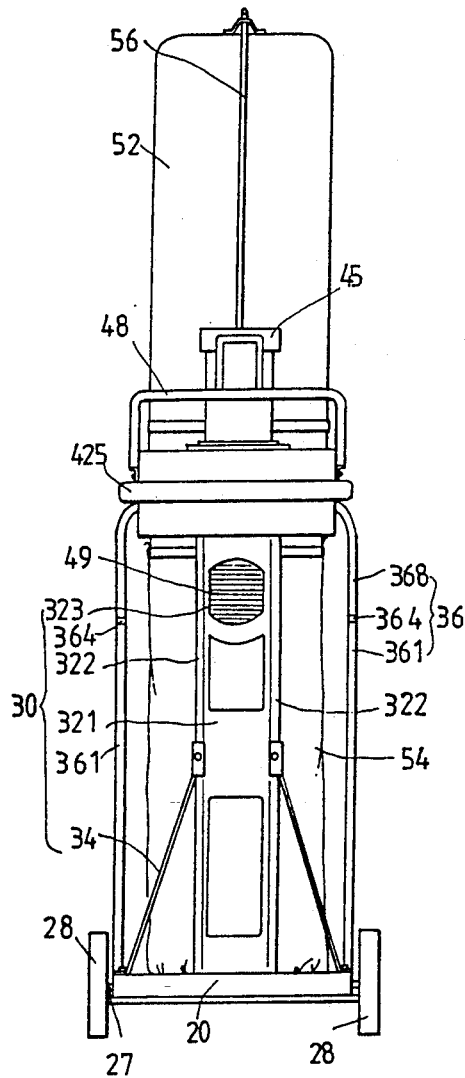
FIG. 3 shows a front view of the industrial dust collector of the present invention.
Figure 4:
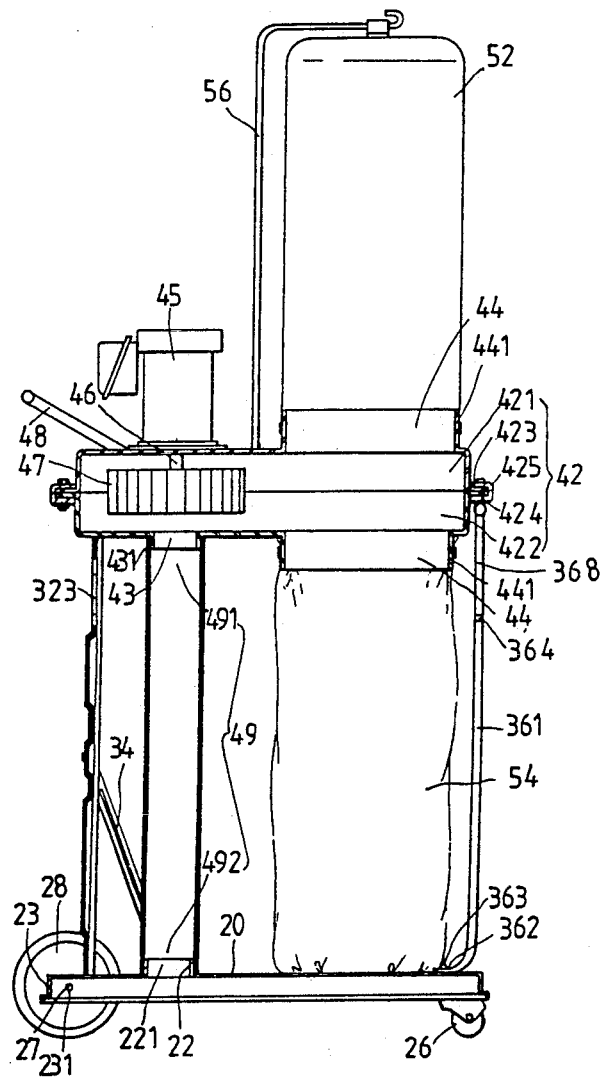
FIG. 4 shows a sectional view of the portion taken along the line 4—4 as shown in FIG. 2.

Referring to FIGS. 2-6, the movable industrial dust collector 2 embodied in the present invention is shown comprising a base 20, a support set 30 disposed securely on the base 20, a suction set 40 arranged securely on the support set 30, and a filtration set 50 set up on the suction set 40.

The base 20 is provided with a column 22 having a columnar hole 221 passing through the base 20, a vertical edge 23 extending downwardly from the periphery of the base 20, a pair of lugs 24 provided respectively with a fastening end 241 secured to the base 20 and with a free end 242 extending outwardly beyond the periphery of the base 20, an axial rod 27 mounted in the two axial holes 231 in such manners that it can turn in the axial holes 231 and that its ends extend beyond the vertical edge 23, and a pair of casters 28 attached to both ends of the axial rod 27 so as to facilitate, in cooperation with another casters 26, an easy and free movement of the dust collector 2.

Figure 5:
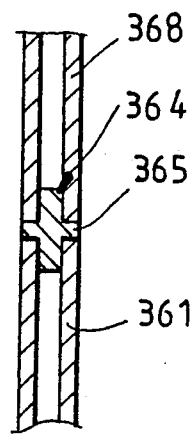
FIG. 5 shows a sectional view of the portion taken along the line 5—5 as shown in FIG. 2.

The support set 30 comprises a support plate 32, a pair of connection plates 34, and a pair of tubular braces 36, which are fastened respectively at lower ends thereof to the front and the rear ends of the base 20. The support plate 32 is provided with a flat portion 321 having a through hole 323 and with a pair of curved portions 322 bending rearward from both sides of the flat portion 321. Each of the two connection plates 34 is fastened at upper end thereof to the corresponding curved portion 322 and is attached firmly at lower end thereof to the base 20. The tubular brace 36 comprises a pair of upright tubes 361, a pair of connection pieces 364, and an inverted U-shaped tube 368 bridging the two upright tubes 361. Each of the upright tubes 361 is provided with a curved portion 362 bending toward the front end of the dust collector 2 and fastened to the base 20 by means of a screw 363. The connection piece 364 is of columnar construction and is provided integrally at midsection thereof with a circular flange 365. The connection piece 364 is designed in such ways that its lower end is fitted securely into the upper end of the upright tube 361 and that its upper end is fitted firmly into the lower end of the inverted U-shaped tube 368, as shown in FIG. 5.

Figure 6:
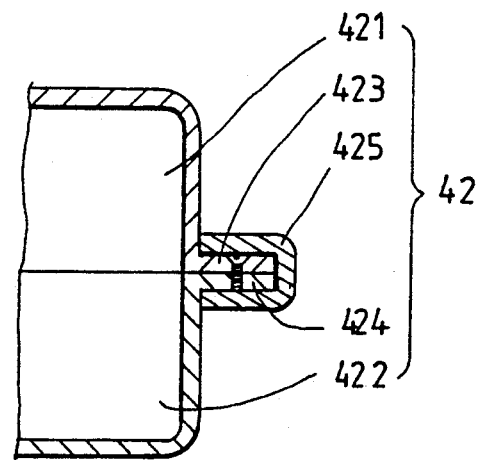
FIG. 6 shows a sectional view of the portion taken along the line 6—6 as shown in FIG. 2.

The suction set 40 comprises a guide box 42 fastened securely to the support plate 32 and the upper portion of the inverted U-shaped tube 368. The guide box 42 is composed of an upper housing 421 of hollow construction and a lower hollow housing 422, which are united by means of their respective flange 423 and flange 424 which are in turn enclosed in a shield 425, as shown in FIG. 6. The suction set 40 is further provided with an air inlet 43 located at lower portion of front section thereof and with two air outlets 44 located oppositely at the rear section thereof. The air inlet 43 and the air outlet 44 are respectively provided at the circumferences thereof with circular flanges 431 and 441 extending beyond the guide box 42. A motor 45 arranged on the front section of the guide box 42 is provided with a drive shaft 46 to which a suction fan 47 facing the air inlet 43 is fastened. There are a push rail 48 attached securely to the guide box 42 and a suction hose 49 disposed between the base 20 and the guide box 42 in such manners that its upper end 491 is fitted over the flange 431 of the air inlet 43 and that its lower end 492 is fitted securely over the column 22 of the base 20. The lower end 492 of the suction hose 49 can be detached with the column 22 of the base 20 and placed out of the through hole 323 of support plate 32. The stream of suction generated by the rapid rotation of the suction fan 47 driven by the motor 45 is directed to flow out of the air outlets 44 via guide box 42. As a result, the dust and the other objects on the shop floor can be drawn into the suction hose 49.

The filtration set 50 comprises mainly a filtration bag 52 disposed over the guide box 42 and a dust bag 54 arranged under the housing 42. The filtration bag 52 and the dust bag 54 are set up in such a way that their open ends are respectively fitted over the circular flanges 441 of the air outlets 44. The filtration bag 52 made of breathable material is suspended by means of a suspension rod 56 with its lower end fastened securely to the guide box 42 and with its upper end bent appropriately to facilitate the suspension of the filtration bag 52. The air, which is drawn into the dust collector 2 along with dust and unwanted objects, is released into the air via the breathable filtration bag 52, while the dust and the objects drawn into the dust collector 2 are deposited in the dust bag 54. The lower end 492 of the suction hose 49 can be disconnected with the column 22 of the base 20 and can be placed through the through hole 323 of the support plate 32 for the convenience of cleaning the machinery and other shop facilities located on the shop floor.

The embodiment of the present invention described above is to be considered in all respects as merely an illustration of principles of the present invention. Accordingly, the present invention is to be limited only by the scope of the hereinafter appended claims.

What is claimed is:

1. A movable industrial dust collector comprising:
   (a) a base comprising a plurality of casters and a column disposed thereon and provided with a columnar hole passing through said base;
   (b) a support set provided with a pair of tubular braces having lower ends thereof fastened to said base and with a support plate;
   (c) a suction set supported securely on said support set and provided with a hollow guide box having an air inlet, two air outlets, and a motor with a suction fan attached to the shaft thereof in such a manner that it is positioned oppositely to said air inlet, said suction set further comprising a suction hose disposed between said base and said guide box in such a manner that it communicates with said air inlet and said columnar hole of said column; and
   (d) a filtration set comprising a filtration bag and a dust bag disposed oppositely to each other, said filtration bag being in communication with one of said air outlets and said dust bag being in communication with the other of said air outlets.

2. A movable industrial dust collector according to claim 1, wherein said tubular brace comprises a pair of first tubular frames with lower ends thereof fastened to said base and a second tubular frame with both ends thereof fastened respectively to said first tubular frames.

3. A movable industrial dust collector according to claim 2, wherein said first and second tubular frames comprise therebetween a pair of connection means of columnar construction provided at midsection thereof with a circular flange and fitted respectively at both ends thereof into said first and second tubular frames.

4. A movable industrial dust collector according to claim 1, wherein said support plate comprises a flat portion extending along the long axis thereof and having a through hole, said flat portion further having curved portions of an angle bending inwardly and respectively from both sides thereof.

5. A movable industrial dust collector according to claim 4 further comprising a pair of connection means, with each fastened at upper end thereof to said curved portion and attached securely at lower end thereof to said base.

6. A movable industrial dust collector according to claim 1, wherein said guide box is composed of an upper housing with an open end having a flange disposed along the periphery thereof and of a lower housing with an open end having a flange disposed along the periphery thereof, said upper housing uniting with said lower housing by means of said flanges covered by a protective means.

* * * * *